Figure 1:
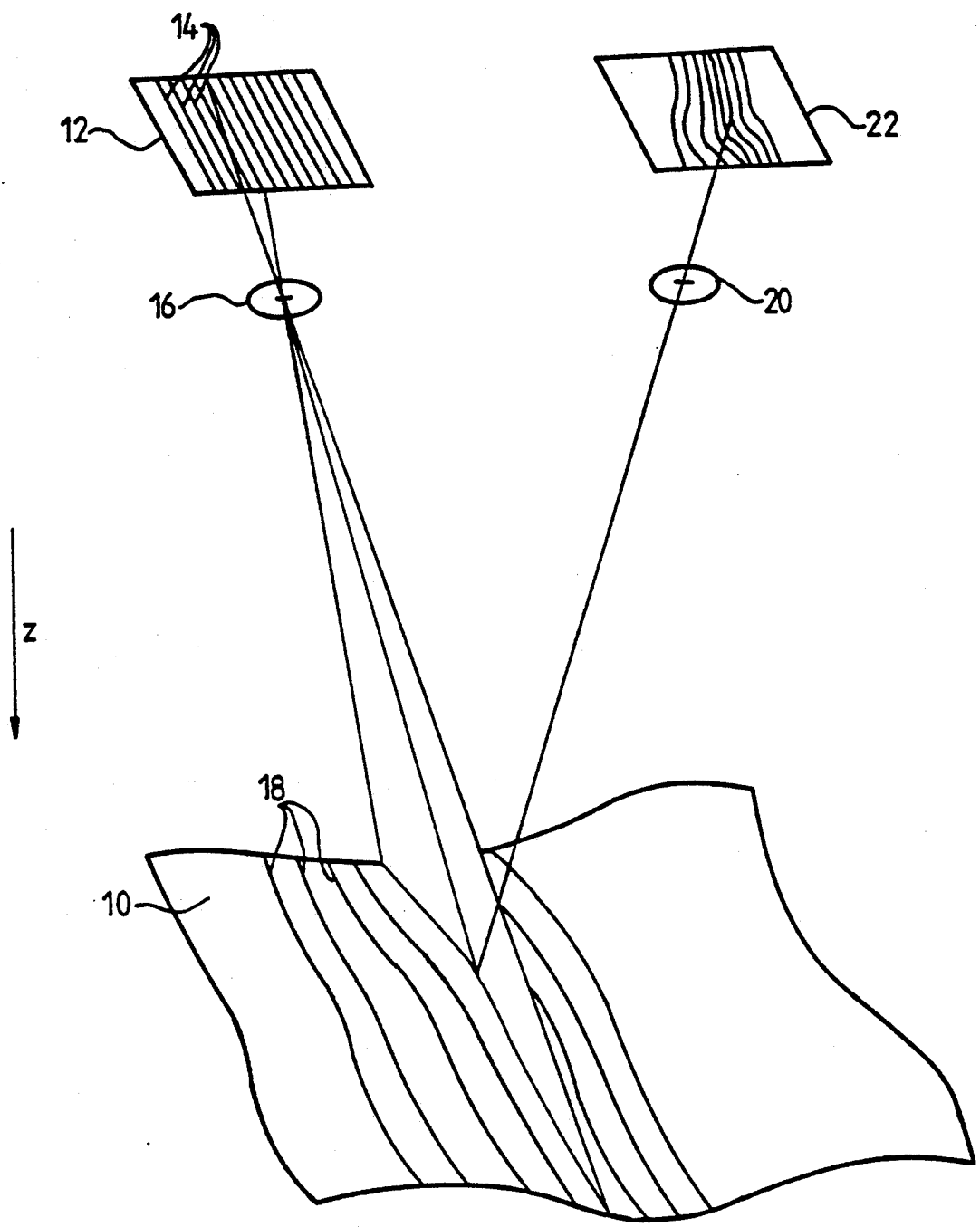

United States Patent
Millet et al.

[11] Patent Number: 5,262,844
[45] Date of Patent: Nov. 16, 1993

[54] APPARATUS FOR DETERMINING THE THREE-DIMENSIONAL SHAPE OF AN OBJECT OPTICALLY WITHOUT CONTACT

[75] Inventors: Jocelyn Millet, Pertuis; Jean-Claude Georgel, Lambesc, both of France

[73] Assignee: Bertin & Cie, Plaisir, France

[21] Appl. No.: 836,329

[22] PCT Filed: Jul. 2, 1991

[86] PCT No.: PCT/FR91/00529
   § 371 Date: Mar. 2, 1992
   § 102(e) Date: Mar. 2, 1992

[87] PCT Pub. No.: WO92/01206
   PCT Pub. Date: Jan. 23, 1992

[30] Foreign Application Priority Data
   Jul. 3, 1990 [FR] France ................... 90 08368

[51] Int. Cl.⁵ .............................. G01B 11/24
[52] U.S. Cl. .................... 356/376; 250/237 G
[58] Field of Search ................. 356/375, 376; 250/237 G

[56] References Cited

U.S. PATENT DOCUMENTS

| | | | |
|---|---|---|---|
| 3,866,052 | 2/1975 | Di Matteo et al. | 356/2 |
| 4,212,073 | 7/1980 | Balasubramanian | 356/376 |
| 4,794,550 | 12/1988 | Greivenkamp | 356/376 |
| 4,871,256 | 10/1989 | Grindon | 357/37 G |
| 4,917,487 | 4/1990 | Cruickshank | 353/28 |
| 5,003,187 | 3/1991 | Zumbrunn et al. | 356/376 |

FOREIGN PATENT DOCUMENTS

| | | |
|---|---|---|
| 288983 | 11/1988 | European Pat. Off. |
| 300164 | 1/1989 | European Pat. Off. |
| 313193 | 4/1989 | European Pat. Off. |
| 379079 | 7/1990 | European Pat. Off. |

*Primary Examiner*—Richard A. Rosenberger
*Attorney, Agent, or Firm*—Bell, Seltzer, Park & Gibson

[57] ABSTRACT

Apparatus for determining the three-dimensional shape of an object by projecting patterns onto the surface of the object, the patterns having fringes with a light intensity that varies sinusoidally in space, said apparatus comprising means (30, 34, 36) for changing the pattern centered on the projection optical axis (28), and cam means (54) for displacing the patterns (12a, 12b) transversely through distances equivalent to phase shifts of $2\pi/n$.

7 Claims, 2 Drawing Sheets

APPARATUS FOR DETERMINING THE THREE-DIMENSIONAL SHAPE OF AN OBJECT OPTICALLY WITHOUT CONTACT

The invention relates to apparatus for determining the three-dimensional shape of an object optically and without contact, said apparatus comprising means for projecting a pattern on the object, which pattern includes fringes or lines with a light intensity that varies sinusoidally in space.

European patent EP 0 182 469, for example, describes the principle of determining the three-dimensional shape of an object by projecting onto the object a field of rectilinear fringes having a light intensity that varies sinusoidally in space, by forming an image of the object on photodetectors, and by measuring the phases of the signals from the photodetectors. To implement this principle, n fields of fringes are projected onto the object using a first pattern, with the fields being phase shifted by $2\pi/n$ from one field to the next, and then, using a second pattern, n fields of fringes having a different pitch are projected onto the object, which fields are likewise successively phase shifted by $2\pi/n$, thereby resolving the $2k\pi$ ambiguity (where k is an integer) in the phase measurements obtained using the first pattern.

In conventional manner, the field of rectilinear fringes may be in the form of a reversal film of the slide type on which a pattern of parallel lines is formed with the transparency of the slide varying sinusoidally in a direction perpendicular to the lines. Means are provided to displace said pattern transversely over n distances equivalent to phase shifts of $2\pi/n$, and means are provided for changing the pattern, so as to remove the $2k\pi$ ambiguity on phase measurement. The measurement must be performed in a time interval that is compatible with the intended application of this principle and which may be relatively short in some applications. The above-mentioned means for displacing and changing the pattern must therefore be as accurate, as rapid, and as reliable as possible.

An object of the invention is to provide apparatus of the above-specified type which satisfies said conditions.

To this end, the present invention provides an apparatus for determining the three-dimensional shape of an object optically and without contact, the apparatus comprising means for projecting the image of a pattern onto the object, the pattern comprising fringes or lines with a light intensity that varies sinusoidally in space, which patterns are formed, for example, on slide type reversal film, and cam means for displacing the pattern in a direction perpendicular to the optical axis of the projection means and perpendicular to the direction in which the fringes or lines of the pattern extend, the apparatus being characterized in that it comprises at least two patterns having fringes or lines at different pitches, which patterns are disposed in the same plane perpendicular to the optical axis and are carried by a moving support guided in translation in a direction perpendicular to the optical axis and parallel to the direction in which the fringes or lines extend, and motor means for driving said support in discontinuous reciprocating motion so as to center each pattern in succession on the optical axis.

This organization makes it possible to change very quickly the different-pitch patterns that must be projected on the object whose three-dimensional shape is to be determined, since this can be done merely by displacing a vertical support in translation over a relatively short stroke.

According to another characteristic of the invention, each pattern is connected to the moving support by two resiliently deformable parallel blades constituting guide means and return means urging the pattern in a direction that is opposite to the direction in which the cam means operate.

These means for mounting the patterns on the moving support then also constitute the means for guiding and returning the patterns, thereby simplifying both the structure and the operation of the apparatus of the invention.

According to yet another characteristic of the invention, the above-mentioned cam means comprise cams rotated about axes that are parallel to the optical axis by the same motor means, each cam acting on an associated one of the patterns.

This disposition also contributes to performing measurements quickly.

Preferably, each cam acts on the associated pattern via a rocker pivotally mounted about an axis parallel to the optical axis and associated with controlled means for putting it into service and for taking it out of service.

The rocker may have a lever-arm function enabling the accuracy with which the associated pattern is displaced to be increased relative to the accuracy with which the cam is machined.

Figure 2:
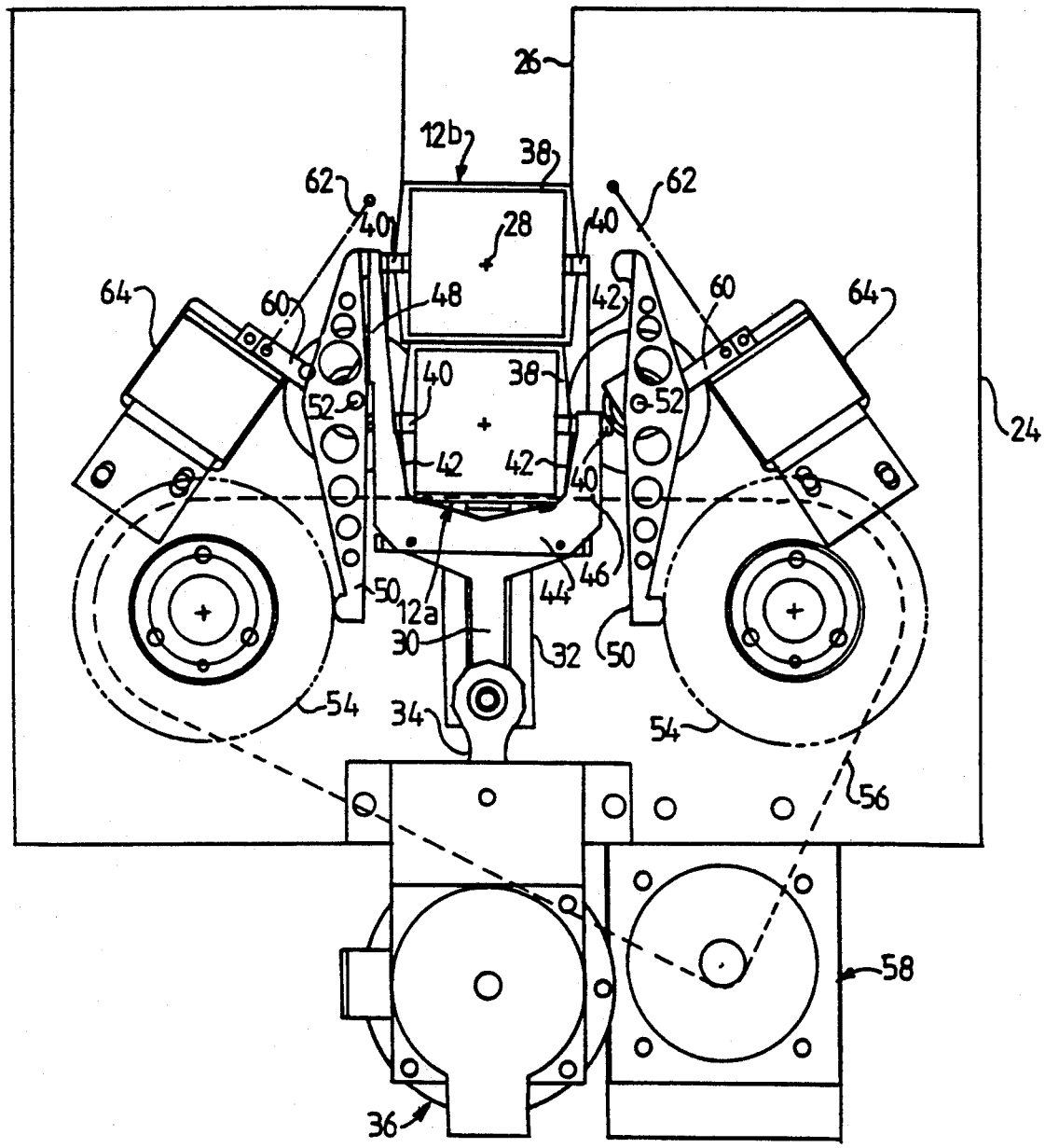

The invention will be better understood and other characteristics, details, and advantages thereof appear more clearly on reading the following description given by way of example and made with reference to the accompanying drawings, in which:

FIG. 1 is a diagram showing the principle whereby the three-dimensional shape of an object is determined by projecting a field of rectilinear fringes; and FIG. 2 is a diagrammatic plan view of means of the invention for displacing and changing pattern.

Reference is made initially to FIG. 1 which is a diagram showing the principle on which the three-dimensional shape of an object is determined by analyzing the phase of the image of a light signal projected onto the object, which image has light intensity that varies sinusoidally in space.

In the figure, reference 10 designates the surface of an object whose shape is to be determined, and on which the image of a pattern 12 of parallel lines or fringes 14 is projected, the light intensity thereof varying sinusoidally in space in a direction perpendicular to the direction in which said lines extend.

It is convenient for the pattern to be formed on a slide type reversal film and it is thus possible to use a conventional type of projector which is represented diagrammatically by an optical system 16 for forming an image of said pattern on the surface of the object 10. When the surface is not plane, the images 18 of the lines 14 of the pattern are no longer rectilinear and parallel, but are deformed by the relief on the surface of the object, and the deformation thereof is representative of the relief of said object.

An optical system 20 serves to form an image of the surface of the object on a set 22 of photodetectors, e.g. of the CCD type, which photodetectors are associated with electronic signal acquisition means and with computer means for processing such signals. For example, a CCD video camera may be used for this purpose in association with a microcomputer.

By analyzing the phase of each light signal detected by each photodetector in the set 22, it is possible to determine the coordinates of points on the surface of the object 10 along an axis z relative to a reference plane. As mentioned above, this is done by projecting n fields of fringes onto the surface of the object, with the fields being phase shifted by $2\pi/n$, where n is often selected to be equal to 4 so as to obtain signals of the following form at the output from the photodetectors (ignoring scale factors):

$I_0 = 1 + \cos \phi$ $I_1 = 1 + \sin \phi$ $I_2 = 1 - \cos \phi$ $I_3 = 1 - \sin \phi$ The phase of the signal from each photodetector can thus be obtained modulo $2\pi$:

$\phi = \arctan [(I_1 - I_3)/(I_0 - I_2)]$

The $2k\pi$ ambiguity on the value of the phase can be resolved by projecting onto the surface of the object a field of fringes that have a different pitch (e.g. greater) than the pitch of the previously-projected field of fringes. This is done by using a second pattern to replace the first.

The means for displacing and changing patterns in accordance with the invention are shown diagrammatically in FIG. 2.

These means are associated with a conventional type of slide projector (not shown) and they are mounted on a plate 24 having a slot or cutout 26 centered on the optical axis 28 of the projector which is perpendicular to the plane of the drawing.

In the example shown, two patterns 12a and 12b are mounted one above the other on a moving support 30 which is guided in vertical translation perpendicularly to the optical axis 28 in a slideway 32 fixed to the plate 24. The bottom end of the moving support 30 is connected by a crank system 34 to the output shaft of an electric motor 36 mounted on the plate 24. The electric motor is of the stepper type and it is controlled to displace the moving support 30 in discontinuous reciprocating motion, thereby enabling one of the patterns and then the other pattern to be centered on the optical axis 28 of the projector.

Each of the patterns 12a and 12b includes a peripheral frame 38 which is rectangular or square in shape and which has two vertical sides each provided with a stud or finger 40 in the middle that projects outwards and forms an engagement zone for the top end of a resiliently deformable blade 42 whose bottom end is fastened to a transverse bar constituting the base of the moving support 30. Each pattern 12a and 12b is thus suspended from the moving support 30 by two parallel resiliently deformable blades 42 which, by bending, enable the pattern to move transversely in a direction which is perpendicular to the optical axis 28 and also perpendicular to the vertical direction in which the moving support 30 moves.

A U-shaped piece 44 has two parallel arms 46 and 48 of different lengths and is fixed on the moving support 30 in such a manner that its arms 46 and 48 bracket the patterns 12a and 12b, with the short arm 46 bearing against the righthand side of the lower pattern 12a and preventing it from moving to the right in the drawing, while the long arm 48 bears against the lefthand side of the upper pattern 12b and prevents it moving transversely to the left in the drawing. The arms 46 and 48 bear against the patterns 12a and 12b respectively so as to urge the suspension blades 42 slightly to the left for the pattern 12a and to the right for the pattern 12b, thereby preventing the patterns and their suspension blades vibrating transversely.

In addition, each pattern 12a and 12b is associated with transverse displacement means essentially comprising in the example shown a rocker or tipper 50 pivotally mounted on the plate 24 about a respective axis 52 that is parallel to the optical axis, and having its bottom end designed to be pressed against the periphery of a cam 54 shown in dot-dashed lines, while its top end is designed to bear against a stud 40 of the associated pattern 12a or 12b.

Both cams 54 are rotated in the same direction and at the same angular velocity by a cog belt 56 which is itself driven by the output shaft of a motor 58 mounted on the plate 24.

Means are advantageously provided for putting each rocker 50 into service and for taking it out of service, which means may comprise, for example, a lever 60 associated with the rocker and mounted on its axis of rotation 52, the free end of the lever being connected to a traction spring 62 which is represented diagrammatically by an axis line. A polarized electromagnet 64 mounted on the plate 24 serves in the absence of excitation current to attract the lever 60 against the action of the spring 62 and to cause it to rotate together with its rocker in a direction that moves the rocker away from the cam 54 and the stud 40 on the associated pattern. In this position, rotation of the cam 54 is not transmitted to the associated pattern 12a or 12b, and the top end of the rocker is also held off the stud 40 of the associated pattern. In contrast, when the electromagnet 64 is excited by an electric current, the spring 62 causes the lever 60 to pivot in a direction tending to bring the ends of the rocker 50 to bear against the cam 54 and against the stud 40 of the associated pattern.

The above means for displacing and changing the patterns operate as follows:

In the position shown in the drawn, the upper pattern 12b is centered on the optical axis 28 of the projector and can therefore be used. The corresponding electromagnet 64 (on the left in the figure) is excited and the corresponding rocker (the one on the left) bears against the associated cam 54 and the lefthand stud 40 of the pattern 12b. Rotation of the cam 54 through one full turn gives rise to transverse displacement of the pattern back and forth in the horizontal direction in the drawing. More precisely, the upper pattern 12b is displaced to the right by the rocker 50 starting from an initial position and it is returned to said initial position by the resilient return force exerted by the suspension blades 42, with the go-and-return displacements of the pattern being symmetrical to double the acquisition rate.

The rocker 50 has a lever-arm effect, thereby increasing the accuracy of the displacement of the associated pattern compared with the accuracy with which the cam is machined, as a function of its lever arm ratio between the cam and the pattern.

The periphery of the cam 54 against which the rocker 50 bears may be continuous or it may be stepped. Each half-periphery of the cam comprises four stages corresponding respectively to phase shifts of 0, $\pi/2$, $\pi$, and $3\pi/2$, or else it has a continuous ramp that causes phase to vary continuously and uniformly through the range 0 to $2\pi$. In either case, rotation of the cam through half a turn causes the pattern to be displaced through distances corresponding to phase shifts of $\pi/2$, $\pi$, and $3\pi/2$ in the field of fringes starting from an initial position that corresponds to a zero phase shift.

When the necessary measurements have been performed while projecting the pattern 12b on the surface of the object, the corresponding electromagnet 64 is de-excited, the lefthand rocker 50 is returned to its out-of-service position by the lever 62, and the motor 36 causes the moving support 30 to move vertically upwards so as to bring the lower pattern 12a onto the optical axis 28 of the projector. By exciting the right-hand electromagnet 64, the rocker 50 is brought into operation, and it transforms the rotation of the associated cam 54 into transverse displacement of the pattern 12a.

By way of example, it may be specified that the patterns 12a and 12b used may have inter-fringe pitches that are relatively very different, with the pattern having the larger pitch being in the upper position on the moving support so that its lateral displacement by bending of the suspension blades 42 can be greater. The cams 54 are driven with an angular velocity that may be about two revolutions per minute, for example, with one revolution corresponding to one back-and-forth displacement of a pattern, and with the pattern being changed by vertical translation of the moving support 30 in a period of a few tenths of a second. Consequently, the time equired to acquire the signals necessary for determining the three-dimensional shape of an object using apparatus equipped with the pattern displacement and changing means of the invention is of the order of a few seconds at most.

The use of cams to displace the patterns provides accuracy of $\mu$m for a displacement of the order of mm or cm, which is impossible when using piezoelectrical or electromechanical means.

Naturally, numerous variants may be applied to the means described and shown above:

for example, the frames 38 of the pattern may be designed so that the cams 54 act directly on the studs 40, thereby avoiding the use of the rockers 50 (the studs 40 could be lengthened for this purpose with the cams 54 being placed level with such studs);

more than two patterns having mutually different pitches could be mounted on a single moving support 30, in which case the support would be displaceable between the same number of positions as it has patterns so as to enable it to bring each pattern successively onto the optical axis of the projector, each pattern of greater pitch serving to remove $2k\pi$ ambiguity on the phase measurements performed using the pattern of immediately smaller pitch; and each cam could be a double-acting cam on the associated pattern to displace it positively in one direction and then in the opposite direction, thereby making the resilient return means pointless.

We claim:

1. Apparatus for determining the three-dimensional shape of an object optically and without contact, the apparatus comprising
   means for projecting onto the object the image of a pattern having fringes or lines with a light intensity that varies sinusoidally in space,
   at least two patterns having fringes or lines at different pitches, which patterns are disposed in the same plane perpendicular to the optical axis of said projection means,
   a movable support carrying said at least two patterns, said support being mounted for moving said at least two patterns in translational movement in a direction perpendicular to the optical axis of said projection means and parallel to the direction in which the fringes or lines extend,
   motor means for driving said support in discontinuous reciprocating motion so as to center each pattern in succession on the optical axis of said projection means, and
   cam means cooperating with said at least two patterns for displacing the pattern in a direction perpendicular to the optical axis of the projection means and perpendicular to the direction in which the fringes or lines of the pattern extend.

2. Apparatus according to claim 1, wherein said cam means comprises at least two cams rotatable about axes that are parallel to the optical axis of said projection means, each cam acting on a respective one of said at least two patterns, and motor means for rotating said cams.

3. Apparatus according to claim 2, wherein each cam acts on the associated respective pattern via a rocker pivotally mounted about an axis parallel to said optical axis and associated with controlled means for putting it into service and for taking it out of service.

4. Apparatus according to claim 3, wherein each pattern includes a frame provided with a lateral finger on which the associated rocker bears.

5. Apparatus according to claim 2, wherein said support carries two fixed abutments, each limiting the displacement of the associated pattern in the direction opposite to the direction in which it is displaced by the associated cam, and against which said pattern is resiliently pressed in the rest position.

6. Apparatus according to claim 1, including a plate with a cutout centered on the optical axis, and wherein said movable support, said motor means, and said cam means are mounted on said plate.

7. Apparatus for determining the three-dimensional shape of an object optically and without contact, the apparatus comprising
   means for projecting onto the object the image of a pattern having fringes or lines with a light intensity that varies sinusoidally in space,
   at least two patterns having fringes or lines at different pitches, which patterns are disposed in the same plane perpendicular to the optical axis of said projection means,
   a movable support carrying said at least two patterns, said support being mounted for moving said at least two patterns in translational movement in a direction perpendicular to the optical axis of said projection means and parallel to the direction in which the fringes or lines extend,
   motor means for driving said support in discontinuous reciprocating motion so as to center each pattern in succession on the optical axis of said projection means,
   cam means cooperating with said at least two patterns for displacing the pattern in a direction perpendicular to the optical axis of the projection means and perpendicular to the direction in which the fringes or lines of the pattern extend, and
   two resiliently deformable parallel blades cooperating with each said pattern and constituting guide means and return means urging the pattern in a direction that is opposite to the direction in which said cam means operates.

* * * * *